March 22, 1966     H. A. ENDE     3,241,752
DOUBLE-SECTOR CENTRIFUGATION CELLS
Filed Jan. 2, 1964
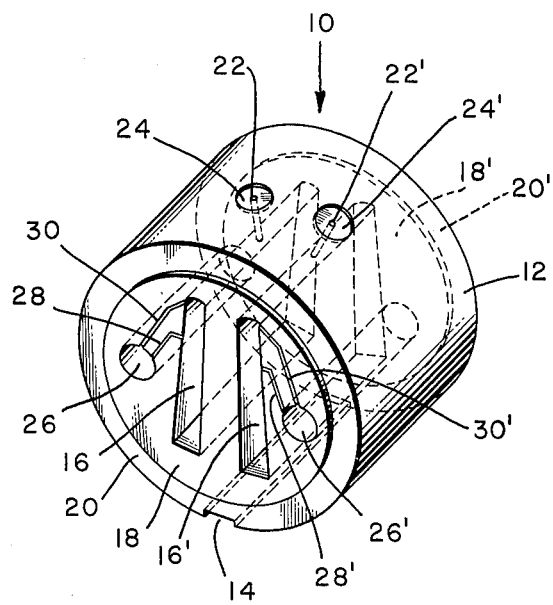
INVENTOR.
HERBERT A. ENDE
BY Leonard A. Willson, Jr.
ATTORNEY United States Patent Office 3,241,752
Patented Mar. 22, 1966

3,241,752
DOUBLE-SECTOR CENTRIFUGATION CELLS
Herbert A. Ende, Cary, N.C., assignor to Monsanto Company, a corporation of Delaware
Filed Jan. 2, 1964, Ser. No. 335,046
8 Claims. (Cl. 233—26)

This invention relates to improvements in the design of what are commonly referred to as double-sector centrifugation cells and, more particularly, to a modification of such cells such that, in operation, the two liquid columns contained therewithin shall automatically and precisely adjust to equal heights.

The use of the ultracentrifuge as an aid in studying macromolecules and colloidal substances has its origins in the investigations of Svedberg and Nichols in 1923 and has had a relatively steady advance to a point where, today, it enjoys the status of a vital and highly versatile discipline. The ultracentrifuge has now reached a degree of development such that routine applications may involve centrifugation of samples at speeds conventionally up to 60,000 r.p.m. to thereby generate gravitational fields adequate to separate materials with differences in either molecular weight or density. The ultracentrifuge has been particularly usfeul in the fields of biochemistry and polymer chemistry in permitting quantitative and qualitative studies of high molecular weight substances.

The refinements in the design of present day ultracentrifuges has been accompanied by improvements in the design of optical systems, sample cells, detection apparatus, etc. to a state that many studies previously impossible are now carried out routinely in a short period of time with a gratifying degree of accuracy. For example, the differential absorption of sedimenting material, as compared to the solvent, using visible and ultraviolet light sources provides a rapid method for studying compositions of, for example, biological and synthetitc polymeric materials.

Since the introduction of quantitative density gradient centrifugation by Meselson, Stahl, and Vinograd, Procedures of the National Academy of Science, volume 43, page 581 (1957), there has been an increasing demand for a refined centrifuge cell better lending itself to experiments in a way not accommodated by conventional cells. Currently, singsle-sectored cells are used for density gradient experiments; however, in order to most expediently obtain all the information available, it becomes most important to ascertain the exact position of the "baseline," i.e. that line optically defined by the refractive index gradients of the solvent occupying one of the two sectors, which baseline is representative of the particular solvent-additive mixture under observation.

As the matter of principle, conventional double-sector cells could be utilized to achieve this result, but it is imperative that the two liquid columns attain a precise equality of height in each sector. A recently described double-sector cell would allow the two liquid columns to attain equal heights, but has certain drawbacks, a primary one being the necessity to correct for dilution, a further disadvantage being the fact that the column heights would differ from one run to another. Equality of the two liquid columns is, moreover, especially necessary in the density gradient experiments when interference optics are employed. This is because interference optics essentially involves the comparison of the refractive indices of the liquid in one sector with that in the other at comparable distances from the axis of cell rotation. The liquid in the two sectors is composed of two solvents differing in refractive index and, upon centrifugation, the heavier solvent sediments towards the bottom of the cell. This sedimentation is strongly opposed by back diffusion, and, at a given speed the flow of the heavier solvent through a unit area within the cell due to sedimentation and diffusion is equal, thus establishing a stable density gradient within the two sectors. It can be shown that the magnitude of the density gradient depends on the column heights of the liquid. Thus, if the column heights in the two sectors do not match precisely, the refractive index at a given distance from the axis of rotation differs in one sector from that in the other. As a result of this inequality in column heights, the baseline in the interference diagram becomes skewed; whereas, for proper evaluation of such a diagram, it is imperative that the baseline be straight. Thus, straightness of the baseline can only be assured by insuring that the column heights in both sectors are equal.

The desirability of a double-sector cell design capable of automatically and precisely assuming an equality of column heights of the liquids occupying the two sectors is clearly indicated.

It is, therefore, an object of the present invention to provide an improved double-sector cell design for use in ultracentrifugation procedures which cell, when subjected to a centrifugal field of sufficient magnitude, will automatically attain a precise equality of heights of the liquid columns occupying the respective sectors or sample chambers.

A further object of my invention is the provision of a double-sector centrifugation cell having means opertive to insure the equalization of the liquid columns contained within each cell, such column equalization taking places automatically and only when the cell is subjected to a predetermined minimum centrifugal force.

According to my invention, the foregoing and other objects are attained by an easily effected modification of a conventional double-sector centrifugation cell for use in ultracentrifuges which renders such cell operative to automatically establish an equaltity of the heights of the liquid columns contained within each sector or sample chamber upon subjection of the cell to a predetermined minimum centrifugal force. This modification takes the form of a system of grooves and reservoirs communicating with the respective sectors in such a fashion that, upon rotation of the cell at a sufficiently high speed, any liquid exceeding a predetermined level within the sectors, as measured radial direction, would be caused to be drawn off into a reservoir in such fashion that the liquid occupying one sector is not diluted by that of the other sector. This is accomplished by an overflow groove communicating between each sector or sample chamber and its associated reservoir, the juncture of each groove with its respective sector being located at equal distances from the "bottom" of the sector. With this arrangement, upon subjecting the cell to sufficiently high speed rotation, any liquid within each chamber exceeding the level of its juncture with its overflow groove will be urged through the groove and into the reservoir. Since the junctures are located equidistant from the bottoms of the cell, the liquid columns contained therewithin will come to assume an identity in heights.

In ultracentrifugation procedures generally, there is provided a relatively massive and precisely configured rotor mounted to be rotated at extremely high speeds, conventionally in excess of 60,000 r.p.m., within an enclosed, evacuated chamber to better retard temperature rises due to atmospheric friction. One or more cylindrical wells are formed in such rotor to extend, in their axial dimension, substantially parallel to the axis of rotation of the rotor element, these wells being shaped to receive cell assemblies of conventional construction. Such a cell assembly normally comprises a barrel or external housing, the cell proper being positioned therewithin at substantially its mid-point. Once the cell has been properly positioned within the barrel, cell windows, of quartz or other suitable material, are positioned in each end of the barrel to bear in fluid-tight engagement against the two end surfaces of the cell proper. So assembled, the barrel is then mounted within the rotor and a run commenced. The general details of ultracentrifuge construction and operation are well and comprehensively presented in Ultracentrifugation in Biochemistry by Howard K. Schachman, 1959, Academic Press, which is hereby incorporated by this reference thereto.

With the understanding that the constructional and operational details of the ultracentrifuge, as above generally referred to, are not considered to constitute a part of my invention, reference shall now be had to the details of the cell proper, an illustrative, but not limitative, embodiment of which is shown in the drawing. As there shown, on a scale approximately five times actual size, the improved cell construction which constitutes my invention takes the form of a double-sector cell, generally indicated by reference numeral 10, having a cylindrical body member 12 provided with a longitudinally extending positioning groove 14, which groove is designed to mate with a tongue member formed integrally along the internal wall of the barrel housing, not shown, which tongue-and-groove arrangement assures proper alignment of the cell within the barrel and of the barrel within the rotor. In the following discussion, it will be assumed that the ultracentrifuge rotor is mounted to spin about a substantially vertical axis, the barrel being positioned within the rotor a radial distance from the axis of rotation, conventionally in the range of 60 to 65 mm. The barrel and the associated cell illustrated in the drawing will normally be positioned within the rotor so that their longitudinal dimension parallels the axis of spin. The result is that cell 10 is subjected to high-speed rotation about an axis substantially paralleling the axial dimension of the cell in such fashion that the centrifugal forces generated will act vertically downward across the face of the cell, as viewed in the drawing.

Within the cell body, there is formed a pair of sector-shaped sample chambers 16, 16′, each chamber subtending a sector angle conventionally ranging between two and four degrees. When the cell has been properly positioned within the rotor preparatory to a run, the side walls of these sector-shaped chambers extend along radial lines intersecting at the spin axis. The chambers 16, 16′ extend entirely through the axial dimension of the cylindrical body 12 to be exposed at their end thereof in the plane of the slightly raised end surfaces 18, 18′. The cylindrical body 12 is provided with recessed shoulder portions 20 completely surrounding raised end surfaces 18, 18′ to promote the integrity of the fluid seal formed between such end surfaces and the previously referred to cell windows, which latter are mounted in pressing engagement thereagainst. The cell is filled after it has been clamped within the barrel between the cell windows by way of individual filler conduits 22, 22′ which, on assembly, register with suitably placed ports in the barrel, not illustrated. Plug depressions 24 surround each of the filler conduits to receive and seat plugs inserted through the barrel wall to seal the sample chambers.

It is to be acknowledged that the cells structure described up to this point is that of a conventional double-sector cell which may easily be modified according to the present invention, as will now be described. Disposed laterally of each of the sample chambers there is formed a reservoir 26, extending between one of the end surfaces 18 axially of the cell body to a depth suitable to accommodate the anticipated overflow, 10 mm. having been found adequate. Obviously, the required capacity of the reservoirs will, in large measure depend upon the level of the junctures of the overflow grooves. Communicating between each reservoir 20 and its associated chamber 16 is a V-shaped overflow groove 28, which groove is machined to intersect the side wall of each sector-shaped sample chamber at level identical to that of the juncture in the remaining chamber. Vent grooves 30, 30′ communicate with each chamber and its respective reservoir to provide essential pressure equalization therebetween.

In operation, the two sample chambers are filled with their respective liquid samples to a level higher than the junctures of overflow grooves 28, 28′. Upon acceleration of the rotor to a suitable velocity, there is generated a centrifugal force (which acts in a vertically downward direction as viewed in the drawing) which urges the liquid in sample chambers 16, 16′ through the overflow grooves 28, 28′ into the reservoirs 26, 26′ until that point is reached where the liquid level in each chamber coincides with the juncture of the overflow groove therewith, at which point the column heights of the liquid will be found equal.

It has been found convenient to machine the overflow and vent grooves to a V-shaped depth approximating .003 of an inch in that a groove of such dimensions is adequate to pass liquids normally being examined under the high centrifugal forces encountered, yet are small enough to retard passage at low speed rotations. Because of this, one is enabled to manipulate the sample-filled cell, when assembled within the previously referred to barrel, in any desired fashion while handling and at low rotative speeds without suffering the chance that the chambers shall be inadvertently drained into the reservoirs to a level below that of the juncture of the overflow grooves 28, 28′ with the chamber wall. By suitably sizing these grooves, the rotative speed at which flow of the sample excess will commence can be roughly controlled to occur at any desired speed.

It may now be appreciated that there has been herewith disclosed a novel and unobvious modification of a double-sectored centrifugation cell which enables one to operate the cell with an equality of liquid column heights without suffering dilution of the liquid occupying one chamber with that of another chamber. Obviously numerous modifications and variations of the present invention will suggest themselves in the light of the above teachings. It is, therefore, to be understood that, within the scope of the appended claims, the invention may be practiced otherwise than as specifically described herein.

What is claimed is:

1. A self-adjusting cell for use in centrifugation procedures comprising a cell body, a pair of sample chambers extending through said body, each chamber having inboard and outboard ends, a pair of reservoirs formed in said body, means fluidly interconnecting each said chamber with one of said reservoirs, the junctures of said fluid interconnecting means with their respective chambers being at equidistant points as measured from the outboard ends of said chambers, whereby, upon subjecting said cell body to a predetermined centrifugal force, fluid within each chamber exceeding said juncture points will discharge into the respective reservoirs to thereby establish an equality of fluid column heights within the respective chambers.

2. A centrifugation cell as defined in claim 1 wherein said fluid interconnecting means is characterized by a pair of overflow grooves formed in the surface of said cell body, each overflow groove communicating between one of said reservoirs and one of said chambers.

3. A centrifugation cell as defined in claim 2 wherein said grooves are V-shaped in cross-section and are of such depth as to obstruct fluid passage therethrough when said cell is subjected to inertia forces below a predetermined level.

4. The cell as defined in claim 3 wherein the depth of said V-shaped grooves is less than 0.004 inch.

5. The centrifugation cell as defined in claim 2 and further characterized by a pair of vent means, each said vent means communicating between the inboard regions of one of said chambers and its respective reservoir.

6. A centrifugation cell as defined in claim 5 wherein each of said vent means is characterized by a V-shaped vent groove formed in the surface of said cell body, said vent groove being of such depth as to obstruct fluid passage therethrough when said cell is subjected to inertia forces below a predetermined level.

7. An automatic level-adjusting cell for use in centrifugation procedures comprising a cylindrical cell body, a pair of radially spaced, sector-shaped twin sample chambers extending axially through said cell body, each chamber having inboard and outboard ends, a pair of reservoirs formed in said body, each disposed laterally of one of said chambers, fluid passage means interconnecting each of said chambers with one of said reservoirs, the junctures of said fluid passage means with their respective chambers being at equidistant points as measured from the outboard ends of said chambers, whereby, upon subjecting said cell body to a predetermined centrifugal force, fluid within each chamber exceeding said juncture points will discharge into the respective reservoirs to thereby extablish an equality of fluid column heights within the respective chambers.

8. In a cell for use in centrifugation procedures, said cell being of the type characterized by a pair of radially spaced, sector-shaped sample chambers formed in a cylindrical cell body, each of said chambers having inboard and outboard ends, the improvement comprising a pair of reservoirs, each disposed laterally of one of said chambers, a pair of overflow grooves, each of said overflow grooves communicating between one of said reservoirs and one of said chambers, the juncture of said grooves with said chambers being at equidistant points as measured from the bottom thereof and a vent groove communicating between the inboard end region of each said chamber and one of said reservoirs, whereby, upon subjecting said cell to a predetermined centrifugal force, fluid within each chamber exceeding said juncture points will discharge into the respective reservoirs to thereby establish an equality of fluid column heights within the respective chambers.

References Cited by the Examiner

UNITED STATES PATENTS 2,340,825   2/1944   Stern _____ 233—66

OTHER REFERENCES

Laboratory Investigation, volume 2, Number 6 Nov.–Dec. 1953, published by Harper and Brothers, Philadelphia, pages 441 to 446.

M. CARY NELSON, *Primary Examiner.*